Figure 1:
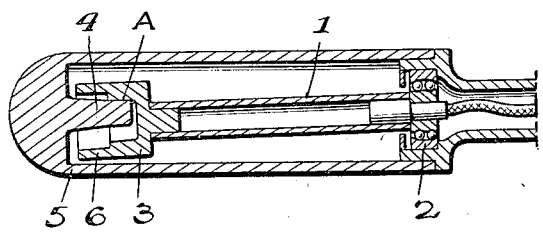

March 16, 1948.  H. S. WENANDER  2,437,983
VIBRATOR
Filed March 24, 1945

INVENTOR.
Harald Svenning Wenander.
BY
Cameron, Kerkam + Sutton
Attorneys

UNITED STATES PATENT OFFICE 2,437,983

VIBRATOR

Harald Svenning Wenander, Riksby, Stockholm, Sweden, assignor to Vibro-Plus Corporation, New York, N. Y., a corporation of Delaware Application March 24, 1945, Serial No. 584,594
In Sweden May 25, 1944

2 Claims. (Cl. 259—1)

The present invention relates to certain useful improvements in vibrating devices of the kind described in the U. S. Patent No. 2,194,410 with the object in view of eliminating certain disadvantages connected with the use of said devices.

The vibrating device according to the U. S. Patent No. 2,194,410 in principle consists of a so called conical pendulum the outer end of which is provided with a weighted member shaped as a body of revolution and provided with an inner or outer circular surface (surface of revolution) which may be brought into contact with a corresponding circular surface belonging to the so-called vibrating member which also supports the pendulum by means of a bearing at its inner end, so that the pendulum when spun around its axis will perform a planetary motion in regard to the vibrating member while rolling on said circular surface of the same, thereby causing the device to vibrate with a high frequency the magnitude of which is a function of the diameters of the two cooperating circular surfaces and the revolving speed of the shaft of the pendulum.

Such vibrators present difficulties in regard to the bearing arrangement of the impulse member (the pendulum) when powerful vibrations are desired, owing to the fact that the pendulum shaft which unites the body of revolution (the so called weighted member) with the bearing, when spun will act on the latter with a centrifugal force having a mainly radially directed component which, for instance when the bearing consists of a so called spherical ball bearing, may become of such magnitude that the bearing is in danger of breaking down.

In order to avoid excess load on the bearing the impulse member should thus be built so that all radial forces are as much as possible taken up by the surface on which the weighted member rolls. According to the invention this is accomplished by giving the pendulum such a shape that the moments of the centrifugal force which are set up on either side of the rolling surface acting as a fulcrum, when the pendulum is spinning, will wholly or partly eliminate (balance) each other, depending upon how much of the radial force is desired to be taken up by the bearing. The pendulum with its weighted member will, in other words, act as a two-armed lever having its fulcrum on the surface on which the weighted member rolls, whereby the resulting moment set up by the pendulum when performing its planetary motion will be brought to act in or near the fulcrum, i. e. the rolling surface.

In the attached drawing are shown two examples of suitable constructions according to the invention, applied to a rod-vibrator of the kind described in the U. S. Patent No. 2,194,410.

Figure 2:
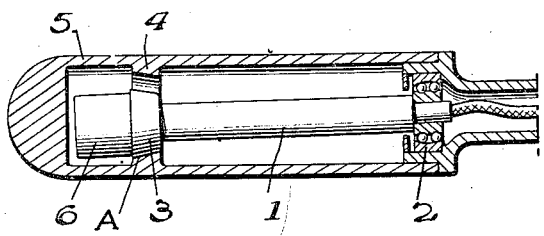

Figure 1 is a longitudinal section of a so called rod-vibrator in which the weighted member with its inside coacts with the rolling surface of the housing; Figure 2 is a longitudinal section of the housing and certain other parts of a similar vibrator as shown in Figure 1, the main difference being that the weighted member in this latter case rolls with its outside against the corresponding surface of the housing. Similar parts bear the same numerals in both figures.

In Fig. 1, the pendulum shaft 1 is at its outer end provided with a weighted member 3, the inner surface of which contacts with and rolls on the surface of the projecting part 4 of the housing 5 when the pendulum spins around its axis and performs its planetary movement, whereby the housing 5 is brought to vibrate. The other end of the pendulum is supported in the bearing 2, which may be a spherical ball bearing or consist of a cylindrical bearing and a universal joint to permit the free swinging of the pendulum. The contacting surface A of pendulum weight 3 and projecting part 4 is arranged at such a point that the rotating masses of the pendulum on either side of zone A will counterbalance each other to the desired degree. The suitable distribution of the mass is e. g. accomplished by making the pendulum shaft hollow and providing the weight 3 with an annular elongation 6 projecting on the other side of the zone of contact A and thus counterbalancing shaft 1.

Fig. 2 shows a corresponding arrangement in a vibrator, the weighted member 3 of which with its outer surface rolls on a centrally projecting part 4 of the housing 5, the zone of contact, as in Fig. 1, being arranged at such a point and the weight 3 being shaped so that its centrifugal moment will counterbalance the centrifugal moment of the pendulum shaft 1 to the desired degree, whereby the radial component of the centrifugal force acting on the bearing 2 is reduced to normal values of strain. This is e. g. accomplished by providing the weight 3 with a projecting part 6 having more or less the same mass as that of the shaft 1.

I claim:

1. In a vibrating device, a vibratory casing, a shaft rotatably supported at one end by and revolving about its axis within said casing, a weighted member fixed to said shaft having a surface of revolution forming a zone of contact with a surface of revolution fixed relatively to said vibratory casing, said weighted member being provided with a part projecting on one side of said zone of such mass as to substantially counterbalance the mass of said shaft on the other side of said zone with said zone serving as a fulcrum, and means for rotating said shaft and weighted member.

2. In a vibrating device, a vibratory casing, a shaft rotatably supported at one end by and revolving about its axis within said casing, said shaft supporting a hollow weighted member the inside of which is shaped as a surface of revolution, said surface of revolution forming a zone of contact with and being arranged to roll on a centrally projecting part of said vibratory casing, said weighted member being provided with an annular elongation projecting beyond said zone on the opposite side from said shaft and counterbalancing the shaft with said zone of contact serving as a fulcrum, and means for rotating said shaft.

HARALD SVENNING WENANDER.

REFERENCES CITED

The following references are of record in the file of this patent:

UNITED STATES PATENTS

| Number | Name | Date |
|---|---|---|
| 1,242,824 | Lindsay | Oct. 9, 1917 |
| 1,549,555 | Jorgensen | Aug. 11, 1925 |
| 1,747,555 | Pelton | Feb. 18, 1930 |
| 2,194,410 | Svenson | Mar. 19, 1940 |